United States Patent [19]

Clary et al.

[11] Patent Number: 5,664,951

[45] Date of Patent: Sep. 9, 1997

[54] INLET CONDUIT ADAPTOR FOR UNDERGROUND STORAGE TANK

[75] Inventors: Robert P. Clary, West Chester; James E. Kesterman, Cincinnati, both of Ohio; Frank G. Lamping, Bellevue, Ky.; Paul R. Wilder, Hamilton; David K. Larson, Cincinnati, both of Ohio

[73] Assignee: Dover Corporation, New York, N.Y.

[21] Appl. No.: 665,582

[22] Filed: Jun. 18, 1996

Related U.S. Application Data

[63] Continuation of Ser. No. 321,636, Oct. 11, 1994, abandoned.
[51] Int. Cl.⁶ .................................................. H01R 13/648
[52] U.S. Cl. ........................ 439/92; 439/191; 141/382; 141/384
[58] Field of Search ........................ 439/86, 88, 89, 439/92, 100, 345, 191–195; 174/35 GC; 141/382, 383, 384

[56] References Cited

U.S. PATENT DOCUMENTS 4,690,212  9/1987  Termohlen .................... 439/191

OTHER PUBLICATIONS

OPW® A Dover Resources Company, OPW Service Station Layouts, OPW Hose End Swivels, Sep., 1992, pp. CD 25.0.

Primary Examiner—Gary F. Paumen
Attorney, Agent, or Firm—Dinsmore & Shohl LLP

[57] ABSTRACT

A swivel adapter for an inlet conduit to an underground storage includes two relatively rotatable components. The relative rotation between the components prevents sealing loss between the adapter and the inlet conduit when the adapter is subjected to torque.

15 Claims, 2 Drawing Sheets

INLET CONDUIT ADAPTOR FOR UNDERGROUND STORAGE TANK

This is a continuation of application Ser. No. 08/321,636 filed Oct. 11, 1994, now abandoned.

TECHNICAL FIELD

The present invention relates generally to inlet conduits for underground storage tanks and more particularly to an adapter for interconnecting an inlet conduit of an underground storage tank to a supply line hose for filling the tank. The invention will be specifically disclosed in connection with a swivel adapter used to interface between a supply hose and an inlet conduit to an underground storage tank for gasoline.

BACKGROUND OF THE INVENTION

It is very common to store gasoline in underground storage tanks. Gasoline service stations, for example, typically, have several underground storage tanks, one for each grade of gasoline. Each of these underground tanks usually is located several feet beneath a concrete driveway or apron that surrounds one or more above-ground service islands that contain pedestal dispensing units for dispensing gasoline to automobiles and other vehicles. The pedestal dispensing units function to register the amount of gasoline dispensed and the cost of that dispensed gasoline. As is common, gasoline is dispensed from the pedestal dispensing units through hand-held dispensing nozzles that are inserted into vehicle gasoline tank fill pipes. The nozzles, each of which are connected to the pedestal units by a hose, include a hand-actuated valve for controlling the amount of gasoline dispensed. Each of the underground storage tanks is connected to one or more of the pedestal dispensing units that dispense the grade of gasoline stored in the tank by an underground fuel line. Pumps, located either in the storage tanks or in the pedestal units, pump gasoline through the underground fuel lines to the dispensing units.

Underground storage tanks of the type described typically are filled through an upwardly extending riser pipe that forms a portion of an inlet conduit for supplying gasoline to the tank. The riser pipe is in fluid communication with the interior of the tank and typically extends between the tank and a spill container that is located near the surface of the concrete apron. The spill container, which functions to protect the surrounding ground soil from spill contamination, extends to the surface of the concrete apron and is usually covered at the surface by a manhole cover. The upper portion of the riser pipe typically is threaded, and threadably receives an adapter for interconnecting the fill pipe to a hose from a tank truck. The adapter has a removable cap fitted thereon for sealing the inlet conduit when the storage tank is not being filled. The adapter and cap are contained within the spill container.

When filling an underground storage tank, the manhole cover is removed to gain access to the riser pipe adapter. After the seal cap is removed from the adapter, a hose from the tanker truck then is mechanically connected to the adapter, and gasoline is discharged through the hose to the inlet conduit and into the underground storage tank.

The lower portion of the adapter normally is sealingly engaged to the riser pipe, an extension of the riser pipe, or another inlet conduit component to prevent leakage of both gasoline flowing through the storage tank inlet conduit and gasoline vapor from the tank. However, prior art inlet conduit adapters have been plagued by the loss of that sealing relationship between the adapter and the inlet conduit. As a result of this sealing loss, gasoline and/or vapor leakage occurs at the adapter inlet conduit interface. Sealing loss between the adapter and inlet conduit is most commonly caused by relative rotation between those components. Unfortunately, rotational torque that tends to cause such relative rotation between the adapter and inlet conduit occurs very frequently in the process of filling an underground storage tank. For example, the rapid shutoff of an overfill valve in the storage tank will create line shock, and this line shock frequently tends to rotate the adapter relative to the inlet conduit. It also is common for truck drivers to move the distal end (the end proximate to the truck) of the tanker truck hose after it has been connected to the adapter, which movement applies a substantial torque on the adapter and tends to cause the adapter to rotate relative to the inlet conduit.

Various solutions to the problem of adapter/inlet conduit seal loss have been suggested. However, none of the previously attempted solutions have been completely successful. For example, it has been suggested that the adapter can be mechanically secured to either the riser pipe or spill container to prevent rotation of the adapter. However, since the seal of the adapter is tightened by rotating the adapter onto the riser pipe or other inlet conduit component, the exact angular position of the adapter in its fully tightened position is variable. Consequently, substantial complexity and expense is required to achieve the necessary adjustability for mechanically securing the adapter against rotational movement.

SUMMARY OF THE INVENTION

Accordingly, it is a primary object of the present invention to provide an adapter for an inlet conduit for an underground storage tank that does not lose its sealing relationship with the remaining components of the inlet conduit when subjected to rotational torque.

It is another object of the invention to provide an adapter for an inlet conduit for an underground storage tank that can be used to prevent the loss of sealing relationship between the inlet conduit independently of spill container structure.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention disclosed herein, a rotatable swivel adapter is provided in combination with an inlet conduit for an underground liquid storage tank. The rotatable swivel adapter is connected on one end to a supply hose for supplying liquid to the underground storage tank. The opposite end of the adapter is connected to the inlet conduit for the tank. The adapter includes a first adapter component that has an inlet, an outlet and a first internal flow passage extending therebetween. The outlet of the first adapter component is fixedly secured to the inlet conduit so as to bring the first internal flow passage being in fluid communication with the inlet conduit. The adapter also has a second adapter with an inlet and an outlet. The second adapter component has a second internal flow passage extending between its inlet and outlet. The second inlet is adapted to be in selective fluid communication with a hose for supplying liquid to the storage tank. The outlet of the second adapter component is rotatably interconnected to the inlet of first adapter component and the second internal flow passage is in fluid communication with the first internal flow passage.

According to another aspect of the invention, the rotatable swivel adapter includes an electrically conductive flexible rod that is located between the first and second adapter components. The flexible rod is operative to prevent relative axial movement between the first and second adapter components, but to allow relative rotational movement between those components. The flexible rod is electrically conductive and also advantageously provides an electrical path between the first and second adapter components.

According to another aspect of the invention, one of the adapter components has a radially projecting structure that varies the dimetral dimension of that one component at the location of the projecting structure. The other adapter components has an annular groove that is aligned in axial correspondency with the projecting structure. The annular groove has upper and lower surfaces that are respectively spaced axially above and below the projecting structure. The annular groove also had an annular surface that is radially spaced from the projecting structure. The projecting surface extends into the annular groove so that the projecting structure and annular groove cooperate to prevent axial movement of the first and second adapter components for a distance greater than the axial spacing between the projecting structure and the groove.

According to still another aspect of the invention, the projecting structure projects radially outwardly from the first adapter component and the diametral dimension of the first adapter component at the location of the projecting structure is greater than the diametral dimension of those portions of the first adapter component that are axially adjacent to the projecting structure.

According to one specific aspect of the invention, the projecting structure is a set screw that is adjustably extendable from the first adapter component in a radially outward direction.

In a still further and different aspect of the invention, an electrically conductive interconnection is provided between two relatively rotatable components. The interconnection includes a first electrically conductive component having an external surface of revolution about a first axis. The external surface has a first annular groove. A second electrically component is rotationally movable with respect to the first component. The second component has an internal surface of revolution about a second axis that is coincident with the first axis. The second surface of revolution has a dimetral dimension that is slightly less than the dimetral dimension of the external surface of revolution with the second surface being at least partially fitted within the first surface. The second surface has a second annular groove that is in axial alignment with the first annular groove. A flexible rod is partially located in both the first and second annular grooves. The annular rod is electrically conductive and provides an electrical path between the first and second components for preventing static electric buildup between those components.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the present preferred embodiment of the invention, an example of which is illustrated in the accompanying drawings, wherein like numerals indicate the same elements throughout the views.

DETAILED DESCRIPTION OF THE PREFERRED EMBODIMENT

Figure 1:
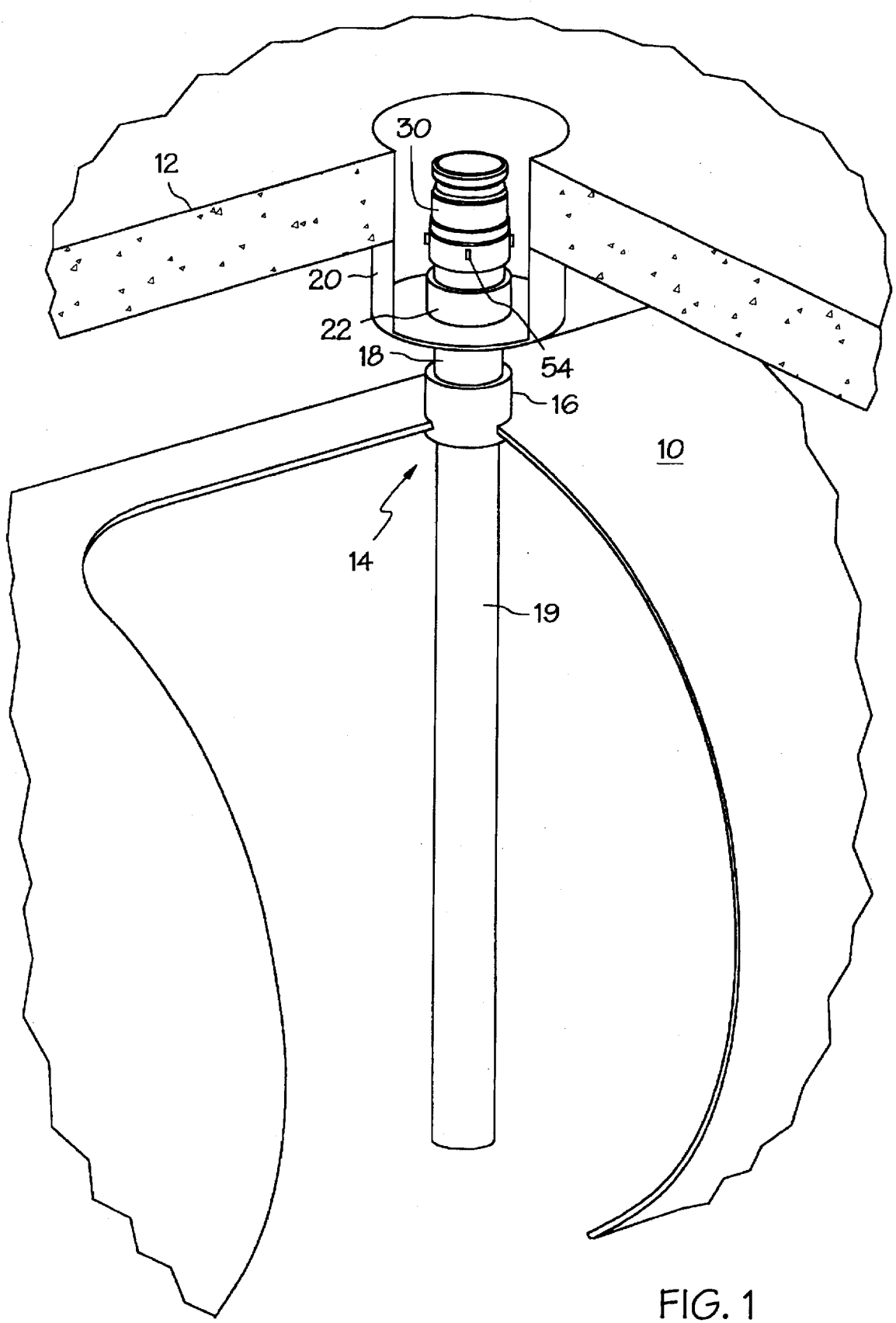
FIG. 1 is a fragmentary perspective view of an adapter constructed according to the principles of the present invention as it is fixedly secured to an inlet conduit of an underground storage tank.

Referring now to the drawings, FIG. 1 shows an underground storage tank 10 located below a driveway 12 of finished grade concrete. The underground tank 10 has a top opening 14 defined by a collar 16 from which a riser pipe 18 extends upwardly to a spill container 20. The riser pipe 18 extends through an opening in the lower surface of the spill container 20, which opening is defined by a collar 22. A drop tube 19, partially obscured by riser tube 18 in FIG. 1 (see FIG. 2) is concentrically disposed within the riser pipe 18. As shown in FIG. 1, the drop tube 19 extends downwardly below the riser pipe 18 into the tank 10. The lower end of the drop tube 19 terminates near the bottom of the tank 10.

As illustrated, the upper external portion of the illustrated riser pipe 18 is threaded, and this external threaded portion of the riser pipe 18 receives an internally threaded lower portion of an adapter 30. In many instances, however, the riser pipe 18 will be connected to the adapter 30 indirectly through riser pipe extensions or spill container components and the like, and not directly connected as shown in the specifically illustrated embodiment. Regardless as to whether the connection is direct or indirect, the adapter defines an internal flow passage that is in fluid communication with the storage tank inlet conduit, either directly with the drop tube as illustrated, or through intermediate components, to provide a liquid flow path for filling the underground tank 10.

As those skilled in the art will readily appreciate, the spill container 20 provides a sealed enclosure for interconnecting between a supply hose (not shown) of a tanker truck and an inlet conduit to the underground tank 10. The spill container functions to contain any gasoline spills that occur during the process of filling the tank 10, and to protect the surrounding ground soil from contamination. For this reason, the adapter 30, which is used to interface between the inlet conduit and the supply hose, is preferably located in the spill container. Although not shown in the drawings, a removable manhole cover (not shown) is used to close the top opening of the spill container 20 when access to the inlet conduit is not required. It also will be appreciated that the adapter 30 normally has a cap (not shown in the drawings) that seals the inlet conduit when the inlet conduit is not in use. The cap has been eliminated from the drawing of FIG. I for clarity of illustration.

Figure 2:
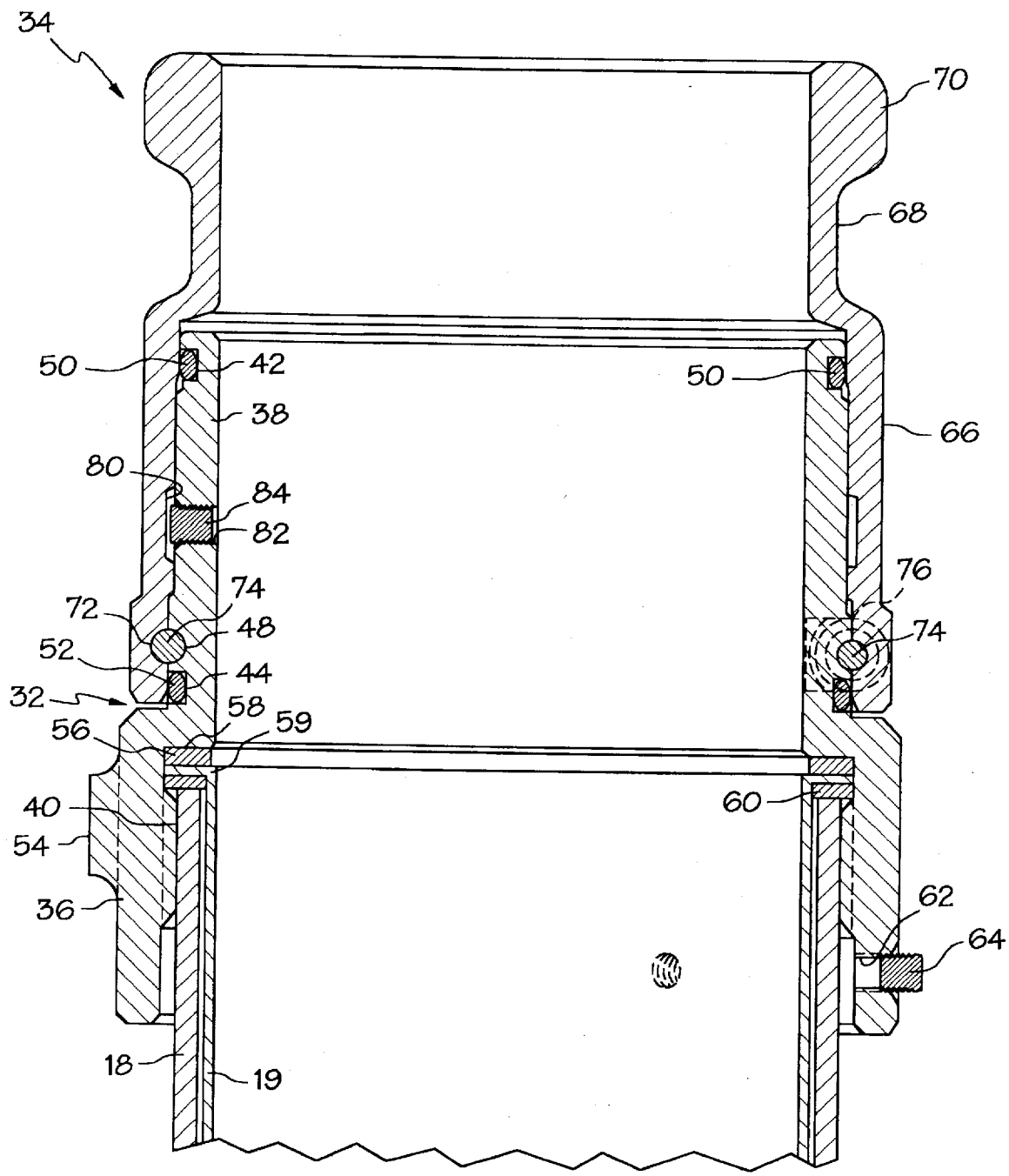
FIG. 2 is an enlarged cross-sectional view of the adapter of FIG. 1 showing the interface between the adapter and the inlet conduit in greater detail.

In accordance with the principles of the invention, and as is apparent from FIG. 2, the adapter 30 includes a first and second relatively rotatable components. As illustrated these components include a male adapter component 32 and a female adapter 34. The male adapter 32 includes a first or lower portion 36 and a second or upper portion 38. The first or lower portion 36 of the male adapter includes an internally threaded surface 40 that is adapted and sized to fit threadably on the exterior threaded diameter of the riser pipe 18. The second or upper portion 38 of the male adapter is of slightly smaller diameter than the first portion 36 and includes three annular grooves: a first groove 42 proximal to the upper end of the male adapter 32 and a second annular groove 44 proximal to the lower portion 36, and a third groove 48 located intermediate the grooves 42 and 44. O-rings 50 and 52 are disposed in the grooves 42 and 44 respectively to provide rotary seals between the male and female adapters 32 and 34. The lower portion 36 of the male adapter 32 has a plurality of angularly spaced bosses 54 on its exterior diameter for rotating the lower portion 36 onto the riser pipe 18. A gasket 56 is interposed between a horizonal section 58 of the lower portion 36 and the top side of a flange 59 of the drop tube 19 to provide a liquid seal between the adapter 30 and the drop tube 19. A further gasket 61 iw positioned the lower side of the drop tube flange 59 and the riser pipe 18 to provide a vapor seal to prevent leakage of vapor rising in the concentric space between the drop tube 19 and the riser pipe 18. The gaskets 56 and 59 are compressingly engaged as the lower portion 36 of the adapter 30 is rotated onto the riser pipe 18. The lower section 36 of the male adapter 32 also includes two threaded apertures 60 (only one of which is shown in FIG. 2) through which set screws 64 are advanced to secure the lower section 36 relative to the riser pipe 18 once the lower section 36 is rotated to a tightened position.

The female adapter 34 of the illustrated adapter 30 has three general sections: a lower section 66, an intermediate section 68 and an upper section 70. The lower section 66 of the female adapter has an internal diameter that is slightly larger than the external diameter of the upper portion 38 of the male adapter 32. The lower section 66 of the female adapter also has an axial dimension that generally corresponds to the axial dimension of the upper portion 38 of the male adapter 32 so as to allow the upper portion 38 of the male adapter 32 to be substantially fully disposed within the lower section 66. The upper section 70 of the female adapter 34 has an external diameter that is generally equivalent to the external diameter of the lower section 66. The intermediate section 68 has an external diameter that is reduced relative to both the lower and upper sections 66 and 70 respectively. The reduced diameter of the intermediate section 68 functions to provide a clamping surface for a seal cap (not shown) and a hose end (not shown) that are fitted over the top of the female adapter 34.

The lower section 66 of the female adapter 34 has an annular groove, identified by the drawing numeral 72, that is positioned in axial correspondency to the annular groove 48 of the male adapter 32. The annular groove cooperates with the groove 48 to provide an annular opening for a flexible rod 74. With the annular grooves 48 and 72 in axial alignment, the flexible rod 74 is inserted into the annular opening formed by the grooves 48 and 72 through an opening 76 in the lower portion 66 of female adapter 34. The opening 76 is preferably threaded, and a set screw (not shown) is used to close the opening 76 once the flexible rod is inserted into the annular opening.

Advantageously, the flexible rod allows the male and female adapters 252 and 254 respectively to rotate relative to each other, but simultaneously restricts these components from relative axial movement. Further, in accordance with another aspect of invention, the flexible rod is formed of electrically conductive material. Hence, the flexible rod provides an electrical path between the male and female adapters 32 and 34 so as to prevent static electric buildup, eliminating the need for grounding plates.

In accordance with still another aspect of the invention, the lower section 66 of the female adapter has a second annular groove 80 about its internal diameter. The annular groove 80 is in axial alignment with a threaded aperture 82 in the upper portion of the male adapter 32. A set screw 84 extends through the aperture 82 and projects beyond the outside diameter of the male adapter's upper portion 38. The projecting structure formed by the set screw varies the dimetral dimension of the upper portion 38 and extends into the groove 80. Preferably, the set screw 84 is not fully advanced into the groove, and the surfaces of the groove 80 are spaced from the set screw, both radially and axially. As those skilled in the art will readily appreciate, such spacing allows the male and female adapters 32 and 34 to rotate freely relative to each other. This arrangement also prevents axial movement of the male and female adapters beyond the axial spacing between the set screw 82 and the groove 80 in the event flexible rod 72 fails.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A fuel adapter for engaging a riser pipe, comprising:
   a first electrically conductive component having an external surface of revolution that is concentrically disposed about a first axis, said external surface having a first annular groove;
   a second electrically conductive component that is rotationally movable with respect to the first component during use, said second component having an internal surface of revolution that is concentrically disposed about a second axis that is coincident with said first axis, said internal surface of revolution having a dimetral dimension that is slightly greater than the dimetral dimension of the external surface of revolution with the external surface being at least partially fitted within said internal surface, said internal surface having a second annular groove that is in axial alignment with the first annular groove; and
   an electrically conductive flexible rod partially located in both the first and second annular grooves, said rod providing an electrical path between the first and second components for the discharge of static electric.

2. An fuel adapter as recited in claim 1, wherein the first electrically conductive component is attached to an inlet conduit for an underground liquid storage tank.

3. An fuel adapter as recited in claim 2, wherein the second electrically conductive component is a swivel adaptor for connecting a supply hose to the inlet conduit.

4. An fuel adapter as recited in claim 1, further including a seal between the first and second electrically conductive components.

5. An fuel adapter as recited in claim 1, wherein the first electrically conductive component has a radially projecting structure that varies the diametrical dimension of the first electrically conductive component relative to axially adjacent portions of the first electrically conductive component, and the second electrically conductive component has an annular groove in axial correspondency with the projecting structure, the annular groove having upper and lower structures that are respectively spaced axially above and below the projecting structure and an annular surface that is radially spaced from the projecting structure, the projecting structure extending into said annular groove whereby the projecting structure and annular groove are operative to prevent the axial movement of the first and second electrically conductive components beyond the axial spacing between the projecting structure and the annular groove.

6. An fuel adapter as recited in claim 5, wherein the projecting structure is a set screw that may be selectively extended from the first electrically conductive component in a radially outward direction.

7. The fuel adapter of claim 1, wherein the flexible rod is in surface contact with both the first and second annular grooves.

8. The fuel adapter of claim 1, wherein the flexible rod is solid in cross section.

9. In combination with an inlet conduit for an underground liquid storage tank, a rotatable swivel adapter for connecting a supply hose to the inlet conduit, said rotatable swivel adapter comprising:

a first adapter component, said first adapter component having an inlet, an outlet and a first internal flow passage extending therebetween, the outlet of said first adapter component being fixedly secured to the inlet conduit with the first internal flow passage being in fluid communication with the inlet conduit;

a second adapter component, said second adapter component having an inlet, an outlet and a second internal flow passage extending therebetween, the second inlet being adapted to be in selective fluid communication with a hose for supplying liquid to the storage tank with the outlet of the second adapter component being rotatably interconnected to the inlet of the first adapter component, the second internal flow passage being in fluid communication with the first internal flow passage; and an electrically conductive flexible rod interposed between said first and second adapter components, said flexible rod being operative to restrict relative axial movement but to allow relative rotational movement between the first and second adapter components, said flexible rod providing an electrical path between the first and second adapter components.

10. A rotatable swivel adapter as recited in claim 9 wherein one of the adapter components has a radially projecting structure that varies the diametrical dimension of said one component at the projecting structure relative to axially adjacent portions of said one adapter component, the other of said adapter components having an annular groove in axial correspondency with the projecting structure, the annular groove having upper and lower structures that are respectively spaced axially above and below the projecting structure and an annular surface that is radially spaced from the projecting structure, the projecting structure extending into said annular groove whereby the projecting structure and annular groove are operative to prevent the axial movement of the first and second adapter components beyond the axial spacing between the projecting structure and the annular groove.

11. A rotatable swivel adapter as recited in claim 10 wherein the projecting structure projects radially outwardly from the first adapter component and the diametrical dimension of the first adapter component is greater than the diametrical dimension of the axially adjacent portions of the first adapter component.

12. A rotatable swivel adapter as recited in claim 11 wherein the projecting structure is a set screw that may be selectively extended from the first adapter component in a radially outward direction.

13. A rotatable swivel adapter as recited in claim 9 further including a seal between the first adapter component and the inlet conduit.

14. A rotatable swivel adapter as recited in claim 9 further comprising a seal between the first and second adapter components.

15. A fuel adapter for engaging a riser pipe, comprising:

a first electrically conductive component having an external surface of revolution that is concentrically disposed about a first axis, said external surface having a first annular groove;

a second electrically conductive component that is rotationally movable with respect to the first component, said second component having an internal surface of revolution that is concentrically disposed about a second axis that is coincident with said first axis, said internal surface of revolution having a dimetral dimension that is slightly greater than the dimetral dimension of the external surface of revolution with the external surface being at least partially fitted within said internal surface, said internal surface having a second annular groove that is in axial alignment with the first annular groove;

an electrically conductive flexible rod partially located in both the first and second annular grooves; and an electrical path for the discharge of static electricity defined predominately by the first electrically conductive component, the second electrically conductive component, and the electrically conductive flexible rod.

* * * * *

UNITED STATES PATENT AND TRADEMARK OFFICE
CERTIFICATE OF CORRECTION

PATENT NO. : 5,664,951
DATED : Sep. 9, 1997
INVENTOR(S) : Clary et al.

It is certified that error appears in the above-indentified patent and that said Letters Patent is hereby corrected as shown below:

On column 5, line 67, please delete "252" and insert therefor --32--.

On column 5, line 67, please delete "254" and insert therefor --34--.

Signed and Sealed this

Twenty-fifth Day of November, 1997

*Attest:*

BRUCE LEHMAN

*Attesting Officer*         *Commissioner of Patents and Trademarks*